UNITED STATES PATENT OFFICE.

THOMAS HODGSON, OF BROOKLYN, NEW YORK.

FIRE-PROOF STONE.

Specification forming part of Letters Patent No. 16,799, dated March 10, 1857.

*To all whom it may concern:*

Be it known that I, THOMAS HODGSON, of Brooklyn, in the county of Kings and State of New York, have invented a new and useful Improvement in Fire-Proof Stone, which can be molded into architectural and other ornamental work; and I do hereby declare that the following is a full, clear, and exact description of the same.

The object of my invention is the production of an artificial fire-proof stone that can be molded into any form, is much stronger and more refractory than stucco-work for architectural ornaments, and which will also stand exposure to the weather, and is thereby eminently fitted for exterior and interior ornamental architectural work, and which can also be manufactured very cheap.

The nature of the invention consists in the useful manufacture of a fire-proof artificial stone composed of the materials or ingredients hereinafter described.

To enable others skilled in the art to make and use the same, I will proceed to describe the materials and the method of manipulating or using them to produce the artificial fire-proof stone.

*The materials.*—I use granite, mica slate, or gneiss, or any stone from which I can obtain feldspar, mica, and quartz; but I prefer to use granite or gneiss and quartz separately, as follows: I take granite and quartz and render them friable in the well-known way, by heating them red-hot and plunging them into cold water. The granite and quartz are then reduced in any mill to powder and each kept separate for use. I then take some sulphate of lime—that of commerce—and keep it separate for use. I then take some ounces of white copperas (sulphate of zinc) and roast them separate in open pans until their water is driven off. They are then reduced to powder and kept separate for use. I then take about half a pound of common copperas (sulphate of iron) and dissolve it in a gallon of water and set it apart for use. I also take some common starch in the state of powder and set it past for use. I then make a clear infusion of tannin from half a pound of the sumac of commerce or the same quantity of oak-bark boiled in a gallon of water for half an hour.

*Method of compounding and mixing them.*—I take about six parts, by measure, of the dry sulphate of lime, two parts of granulated granite, and one part of the granulated quartz and mix them altogether dry. I now take a clean board, or I use a table to mix the ingredients upon. To every bushel of the granite, quartz, and sulphate of lime mixture I now add the one-sixteenth of an ounce of the sulphate-of-zinc powder described and one ounce of the starch-powder. These are all intimately mixed dry. I then knead them into a dough or mortar state, with the tannin solution and the sulphate-of-iron solution in about equal quantities. I mix them thoroughly but quickly and knead the composition rapidly and place it in a proper mold to give it the form or forms desired, and it is allowed to stand for about from two to five minutes, when it may be taken from the mold, and is then fit for immediate use, forming my artificial fire-proof stone. The molds should be rubbed lightly with sweet or lard oil before the plastic compound is placed in them. Common plasterers' molds will answer for molding the stone.

I do not confine myself to the exact quantities described, as a slight departure from them will not alter the nature of the artifical stone; but the quantities given I have found to be the best.

An oak-bark solution produces a stone of a light buff color; that of a sumac solution a purple color. This is accomplished by the iron of the copperas and the tannin. Of course different quantities of these will produce different shades of color in the stone. Granite contains mica, feldspar, and quartz—very refractory substances. When mixed with sulphate of lime and water and formed into cement they make a very refractory easily-molded stone; but it does not possess cohesion; it is brittle.

By experiment I have found or discovered that the starch and the tannin solution and the zinc and iron sulphates described act the part of cohesive binding agents to give strength and a durable character to my artificial stone. The salts of zinc and iron, I believe, act the part of slow assimilating fluxes to unite and bind the particles of the mica, feldspar, quartz, and sulphate of lime together, and the starch also acts as a vehicle to assimilate and unite all of them together.

My artificial stone is more refractory than pure granite or common fire-brick or quartz. I have vitrified granite and fire-brick in a furnace, while my artificial stone, placed with them to test its fire-proof character, was not vitrified in the least.

My artificial stone stands exposure to the atmosphere, and is thus superior to stucco for the exterior decoration of buildings. Most of the metallic oxides like those I use combined with tannin render it insoluble in water. Tannin also unites with starch and forms an insoluble compound; and thus the ingredients which I employ are by their very nature adapted to the purpose for which they are used.

I may obtain mica, feldspar, and quartz or silica from granite, mica slate, or gneiss or other rocks. My object is to use about twice the quantity of quartz to that of the feldspar and the mica; but no carbonate of lime in any form is used; neither must potash or oxide of calcium form part of my artificial stone, because these substances would destroy its cohesive character after being exposed to fire.

I have thus endeavored to explain the nature of the action of the materials or substances forming my artificial fire-proof stone. Such a product or manufacture of the same materials never (so far as I know) has been made before. Its character for usefulness renders it superior to any compound ever employed for the same purpose.

Having thus described my invention, I claim—

The useful manufacture of a fire-proof artificial stone composed of feldspar, mica, and quartz, and the other substances or materials herein described, in the manner and for the purpose set forth.

THOS. HODGSON.

Witnesses:
  W. TUSCH,
  JAMES F. BUCKLEY.